(12) United States Patent
Muraleedhara et al.

(10) Patent No.: US 11,360,442 B2
(45) Date of Patent: Jun. 14, 2022

(54) EXPOSURE MINIMIZATION RESPONSE BY ARTIFICIAL INTELLIGENCE

(71) Applicant: Morgan Stanley Services Group Inc., New York, NY (US)

(72) Inventors: Kesavanand Muraleedhara, Jersey City, NJ (US); Ahmed Jedda, Montreal (CA); Paulo Pinto, London (GB)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 16/264,668

(22) Filed: Jan. 31, 2019

(65) Prior Publication Data
US 2020/0249639 A1    Aug. 6, 2020

(51) Int. Cl.
G05B 13/02    (2006.01)
(52) U.S. Cl.
CPC ................. G05B 13/0275 (2013.01)
(58) Field of Classification Search
None
See application file for complete search history.

(56) References Cited

U.S. PATENT DOCUMENTS

| | | | |
|---|---|---|---|
| 4,570,257 A * | 2/1986 | Olson ............. | G06F 13/372 370/216 |
| 9,646,428 B1 | 5/2017 | Konrardy et al. | |
| 9,701,307 B1 | 7/2017 | Newman et al. | |
| 10,469,327 B1 * | 11/2019 | Velmurugan ...... | G09B 19/0053 |
| 10,599,155 B1 * | 3/2020 | Konrardy ............. | B60W 30/09 |
| 10,911,473 B2 * | 2/2021 | Compton ............... | H04L 69/22 |

(Continued)

FOREIGN PATENT DOCUMENTS

| | | |
|---|---|---|
| CN | 102387163 A | 3/2012 |
| JP | 2007233765 B2 | 9/2007 |

(Continued)

OTHER PUBLICATIONS

"Jumps in the Stock Returns: Evidence from the Warsaw Stock Exchange", Barbara Bedowska-Sojka Available at http://ssrn.com/abstract=2019968.

*Primary Examiner* — Jason Lin
(74) *Attorney, Agent, or Firm* — Weitzman Law Offices, LLC (57) ABSTRACT

An artificial-intelligence system for manipulating resources to minimize exposure harm in a chaotic environment, comprising autonomous agent devices, remote electronic sensors, and a central server. The central server receives a first set of sensor readings from one or more remote electronic sensors, during a first time window, the sensor readings recording values of one or more variables in the chaotic environment; receives a critical time interval during which the chaotic environment may affect one or more of the resources and a maximum permitted risk exposure for the time interval; determines a weighted total risk exposure during the critical time interval from the chaotic environment and the resources within the chaotic environment; determines that the weighted total risk exposure exceeds the maximum permitted risk exposure; and causes the autonomous agent devices to manipulate the one or more resources to decrease the weighted total risk exposure.

16 Claims, 4 Drawing Sheets

(56) References Cited

U.S. PATENT DOCUMENTS

| | | | |
|---|---|---|---|
| 2002/0184070 A1* | 12/2002 | Chen | G06Q 10/06311 705/7.13 |
| 2005/0055249 A1 | 3/2005 | Helitzer et al. | |
| 2006/0025897 A1* | 2/2006 | Shostak | G08G 1/017 701/1 |
| 2012/0143488 A1* | 6/2012 | Othmezouri | G06K 9/00798 701/301 |
| 2012/0317058 A1* | 12/2012 | Abhulimen | G06N 20/00 706/2 |
| 2015/0025917 A1* | 1/2015 | Stempora | G06K 9/0061 705/4 |
| 2015/0156031 A1 | 6/2015 | Fadell et al. | |
| 2015/0284001 A1* | 10/2015 | Watanabe | H04N 7/18 701/36 |
| 2015/0344030 A1* | 12/2015 | Damerow | B60W 30/0956 701/1 |
| 2016/0350683 A1* | 12/2016 | Bester | G06Q 10/0633 |
| 2017/0214701 A1 | 7/2017 | Hasan | |
| 2017/0279843 A1 | 9/2017 | Schultz et al. | |
| 2018/0075309 A1* | 3/2018 | Sathyanarayana | G06N 7/005 |
| 2018/0075538 A1 | 3/2018 | Konrardy et al. | |
| 2018/0114067 A1* | 4/2018 | Kwon | G06K 9/00362 |
| 2018/0164825 A1* | 6/2018 | Matus | G05D 1/0214 |
| 2018/0276485 A1* | 9/2018 | Heck | G01C 21/3461 |
| 2018/0341571 A1* | 11/2018 | Kislovskiy | G06F 8/65 |
| 2018/0365533 A1* | 12/2018 | Sathyanarayana | G06K 9/6267 |
| 2019/0088148 A1* | 3/2019 | Jacobus | B60W 10/18 |
| 2019/0342297 A1* | 11/2019 | Adjaoute | G06N 20/00 |

FOREIGN PATENT DOCUMENTS

| | | |
|---|---|---|
| JP | 2008307951 B2 | 12/2008 |
| JP | 2010015386 B2 | 1/2010 |
| JP | 2010018162 B2 | 1/2010 |
| JP | 2015228204 B2 | 12/2015 |

* cited by examiner

EXPOSURE MINIMIZATION RESPONSE BY ARTIFICIAL INTELLIGENCE

FIELD OF INVENTION

This application relates to artificial intelligence methods and systems, and more specifically, for methods and systems for an artificial intelligence to analyze sensor data from a chaotic environment and modify the behavior of an autonomous system in response to changes in that environment.

BACKGROUND

In many engineering and computing applications, a system must be designed with a certain risk tolerance in mind. Buildings are often designed to survive not only a typical average level of wind over a day, but the so called "hundred year storm," a storm that could possibly occur on any given day but is statistically unlikely to occur more often than once per hundred years. Online services for critical commerce or information sharing are advertised as having "five nines" availability (i.e., being functional 99.999% of the time, with fewer than six minutes of downtime per year) and need to be able to handle a completely unpredictable surge in network traffic without dropping incoming requests for connections.

As a result, there continues to be a need in many computing applications and other fields for better anticipation of systemic changes and re-allocation of resources to mitigate the harms from extreme changes that may or may not imminently occur. This anticipation can be facilitated by the increasing use of distributed sensor systems as part of the "Internet of Things" and the increased incorporation of software into traditionally "dumb" devices to make autonomous vehicles, "smart" thermostats, and other "smart" systems, appliances, and devices that have a greater awareness of their operating environment and a greater capability to respond to it.

SUMMARY OF THE INVENTION

Disclosed herein is an artificial-intelligence system for manipulating resources to minimize exposure harm in a chaotic environment, comprising one or more autonomous agent devices and a central server. The central server comprises a processor and non-transitory memory storing instructions that, when executed by the processor, cause the processor to: receive a first set of sensor readings from one or more remote electronic sensors, during a first time window, the sensor readings recording values of one or more variables in the chaotic environment; receive a critical time interval during which the chaotic environment may affect one or more of the resources and a maximum permitted risk exposure for the time interval; determine, based on the first set of sensor readings, a weighted total risk exposure during the critical time interval from the chaotic environment and the resources within the chaotic environment; determine that the weighted total risk exposure exceeds the maximum permitted risk exposure; and in response to determining that that the weighted total risk exposure exceeds the maximum permitted risk exposure, cause the one or more autonomous agent devices to manipulate the one or more resources to decrease the weighted total risk exposure.

Further disclosed is an artificial-intelligence method for manipulating resources to minimize exposure harm in a chaotic environment, comprising: receiving a first set of sensor readings from one or more remote electronic sensors, during a first time window, the sensor readings recording values of one or more variables in the chaotic environment; receiving a critical time interval during which the chaotic environment may affect one or more of the resources and a maximum permitted risk exposure for the time interval; determining, based on the first set of sensor readings, a weighted total risk exposure during the critical time interval from the chaotic environment and the resources within the chaotic environment; determining that the weighted total risk exposure exceeds the maximum permitted risk exposure; and in response to determining that that the weighted total risk exposure exceeds the maximum permitted risk exposure, causing one or more autonomous agent devices to manipulate the one or more resources to decrease the weighted total risk exposure.

DETAILED DESCRIPTION

Figure 1:
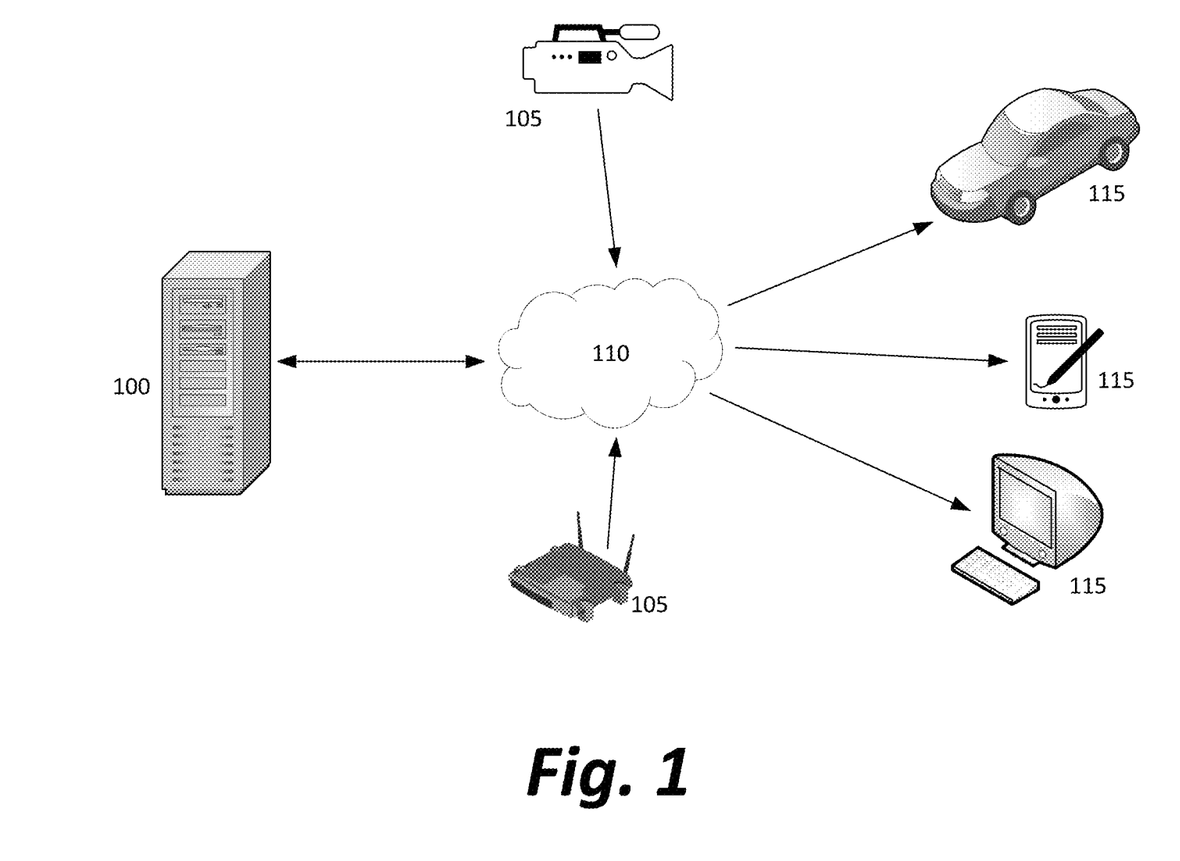
FIG. 1 depicts a computing system for receiving sensor readings from a chaotic environment and directing autonomous agents in response to changes in that chaotic environment.

FIG. 1 depicts a computing system for receiving sensor readings from a chaotic environment and directing autonomous agents in response to changes in that chaotic environment.

Many engineering, computing, and social systems are influenced by a chaotic environment in which they operate. Buildings, bridges, neighborhoods, and other engineering projects are built in areas that may be affected by hurricanes, wildfires, or other environmental hazards; networked computing devices operate on networks with unpredictable surges in network traffic or rerouting of network traffic due to broken network links; public utilities and private services must supply services to a distributed group of consumers that may demand access to service at any time; companies may offer valuable assets for trade in a market where asset prices are constantly changing and a mis-timed offer may be economically wasteful.

The costs of interference from chaotic systems may be realized in incremental or marginal effects (e.g., individual homes being put in danger as a wildfire advances, smoothly decreasing network function as traffic increases, or flickering power access from a strained power grid, etc.) and/or in sudden, catastrophic losses (e.g., a collapse of a major bridge from hurricane winds, a server being completely disabled by a denial-of-service attack, or a power grid going completely dark, etc.).

Turning now to the elements of FIG. 1, a central server 100 receives, via a network 110, sensor data from a number of remote electronic sensors 105 that observe or relay data from a chaotic environment in which one or more important resources are present. Central server also transmits instructions, via network 110, to a number of electronic computing device agents 115 that are capable of directly or indirectly acting to preserve the important resources from harm caused by the chaotic environment.

Network 110 may be, for example, the Internet generally, a local wireless network, an ethernet network or other wired network, a satellite communication system, or any other means of connecting the sensors 105 to the central server 100 and the central server to the agents 115 to enable data transmissions. Moreover, network 110 may not be a single network, as pictured, rather than a number of separate networks; for example, a central server 100 could have a number of proximal sensors 105 to which it is attached by wired connections, a number of nearby sensors 105 to which it connects via a Wi-Fi network, and/or a number of extremely remote sensors 105 to which it connects via a satellite. Connections may avoid the use of a network entirely, and use direct wired or wireless transmission to send data to and from central server 100. As depicted in FIG. 1, arrows show the expected direction of data flow to and from the network.

Sensors 105 may be any types of electronic sensors that register data from a chaotic environment external to the central server 100. Example sensor types for particular embodiments may include, but are not limited to, cameras, thermometers, GPS tracking devices or other geolocation devices, sensors of motion/distance/acceleration/orientation of an object to which the sensor is attached or of a remote object observed by the sensor, or communications modules receiving electronic data communications from a source.

Agents 115 may be any form of computing device (or a module incorporated into a device not normally used as a computing device in order to control that device) able to cause the resources to be reallocated, transported, moved, created, destroyed, or otherwise manipulated in a way that minimizes a harm from a chaotic environment's interaction with the resources. For example, an agent 115 could be a computing device that controls automated systems within a building, that triggers a physical alarm, that pilots a drone aircraft or autonomous vehicle, that routes network traffic, that generates messages for display on physical devices associated with human users, or that performs other actions associated with "smart appliances" or other automated systems.

A number of possible pairings of sensors 105 and agents 115 to achieve particular purposes are described below.

In one example embodiment, listening devices 105 at a power generation plant may receive signals from smart power meters 105 at a number of homes and businesses drawing power from the plant. As power draw increases, the risk of a brownout from insufficient power generation or of blackout from sudden component failure may likewise increase. An automated system 115 of the plant may determine whether to spin up additional turbines, prioritize power output to certain outgoing channels, or otherwise manipulate power generation resources and the network supplying outgoing power to reduce the risk of a brownout or blackout.

In another example embodiment, a video streaming service may have a firewall or edge network device 105 receiving and routing a number of requests to stream certain video files. Each particular customer may begin watching a movie or episode of half-an-hour or longer that must continue to be supplied smoothly for the duration of that period of time even if additional customers begin logging on and requesting other video data, though some customers will log off before a full movie or episode is completed. A content delivery network (CDN) management system 115 may review the current utilization of the network and distribute copies of movie files to secondary CDN servers to minimize the risk that bandwidth will be completely used and either cause additional customers to be able to access data, or original customers to experience an interruption in the viewing experience.

In another example embodiment, an autonomous vehicle with camera, rangefinding, and other sensors 105 may be travelling along a road with some number of other vehicles, pedestrians, or other objects nearby. A server 100 may need to continually assess a number of likelihoods of critical accidents, such as a likelihood that a car at a given distance away will swerve into the autonomous vehicle's path before the autonomous vehicle is able to avoid it, or that a pedestrian walking toward the road will continue walking into the road instead of stopping at the side, and direct a vehicle control system 115 to change its path or speed to decrease the risk of an accident.

In another example embodiment, weather satellites, anemometers, or Doppler radar systems 105 may detect weather systems or hazards, such as hurricanes, wildfires, or tornadoes, that may approach neighborhoods, cities, or other settlements. A determination may need to be made regarding the total cost of an evacuation in response to a hazard, versus the expected cost of not evacuating, which must take into account the possibility that the hazard will never reach the human settlements. Similarly, vehicles, ships, or other valuable items may need to be moved in response to an approaching hailstorm, sandstorm, or other weather event that may or may not actually affect a given location. Alarm system or notification system 115 may be configured to trigger if and only if the potential harm of not evacuating meets a predefined threshold value of risk, or autonomous vehicle control systems 115 may be instructed to pilot a vehicle to a given location if the risk of damage or destruction of the vehicle becomes unacceptably high based on the current weather conditions.

In another example embodiment, sensors 105 may include firewalls or routers at the edge of a computer network, reporting an incoming number of network packets, while agents 115 may include servers in a server cluster, routers, or firewalls. A system may monitor the current network utilization and compute the risk that a denial of service attack will occur and will be able to take down the system under its current configuration. In response, it may either activate more servers to handle the attack or slow down an inflow of network traffic until the risk of network failure is sufficiently decreased.

In another example embodiment, sensors 105 may include GPS trackers on a number of animals, or cameras recording the locations of animals in a nature preserve. A predator or territorial herbivore in the preserve, such as a lion or elephant, may move somewhat randomly in the vicinity of humans currently in the preserve. A central server may continually assess a risk that the animal will encounter the humans before the humans leave the preserve, and cause notification system, alarm, or the humans' personal mobile computing devices 115 to warn the humans about the possibility of an encounter and suggest a path that minimizes the risk of the encounter.

In another example embodiment, sensors 105 may include devices at a stock exchange or other market reporting the current buy or sell prices of one or more assets. Agents 115 may include computing devices capable of transmitting buy or sell orders toor recalling buy or sell orders from—the market, or firewall devices capable of preventing such computing devices from successfully transmitting a buy or sell order to the market. In response to an exposure to unacceptable levels of asset-based risk (such as orders to sell an asset at a fixed price or to buy an asset at whatever price is available in a market where the price of that asset is rapidly increasing), the ability of traders to trade may be automatically stopped by the computing devices themselves, or traders may be notified of the anomaly so they may proceed with greater caution.

In all of the above described systems, there is value in determining a total risk exposure if no action is taken by the system, and using this determination to decide whether action is warranted to minimize or eliminate the risk to which the system is exposed.

Figure 2A:
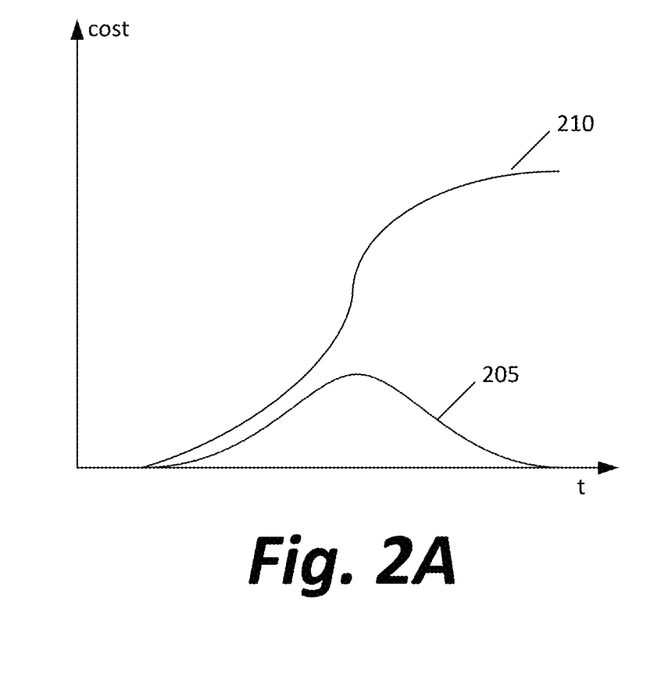
FIG. 2A and FIG. 2B depict conceptual graphs of risk exposure from a hazard over a period of time.
Figure 2B:
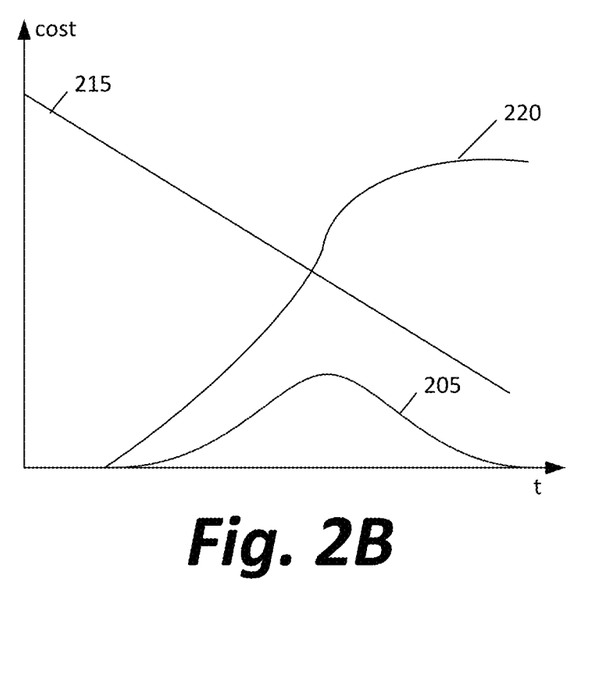

FIGS. 2A and 2B depict conceptual graphs of risk exposure from a hazard over a period of time.

In a simple situation (FIG. 2A) where the expected time until an adverse event occurs is normally distributed, one might expect to see a graph 205 of the probability that the event will occur exactly at time t take the form of a traditional bell curve. The graph 210 of cumulative probability of the event occurring at or before time t would thus have a sigmoid shape as it includes the sum of all points on graph 205 occurring before it in time.

If it is assumed that the cost of the event from affecting a resource is independent of when the event occurs, the cumulative risk exposure based on that resource is simply proportional to the cumulative probability 210 at the conclusion of any time window being considered.

If, in contrast, the timing of the event matters in determining the harm of that event, the cumulative risk exposure based on the resource will be integral of a harm function multiplied by a probability function—i.e., the sum, for every moment of time considered, of the probability that the harm will occur at that moment multiplied by the amount of harm that will be incurred if it does.

For example (as illustrated in FIG. 2B), a community may be considered to incur a harm equal to X if struck by a hurricane while evacuated, but equal to 10X if struck while inhabited. If an evacuation is ordered, the harm function 215 will decrease over time as the people are evacuated, and even though curve 205 of the probability of the event at time t is unchanged, the harm at a given time multiplied by probability of event at the given time will look very different from the probability curve alone, and so the graph of weighted cumulative exposure risk 220 will behave differently, with a sharper initial increase and a quicker leveling off. The difference in cumulative exposure risk if evacuation is ordered and a separately computed cumulative exposure risk if no evacuation is ordered may be the basis of an automated system's determination to alert inhabitants or to instruct safety personnel that an evacuation should begin.

Weighted risk exposures may be calculated for a variety of adverse events (for example, multiple hurricanes) and/or for a variety of resources (for example, each settlement that a hurricane might strike) and summed to determine a total weighted risk exposure for an action or an inaction within a given chaotic environment.

Figure 3:
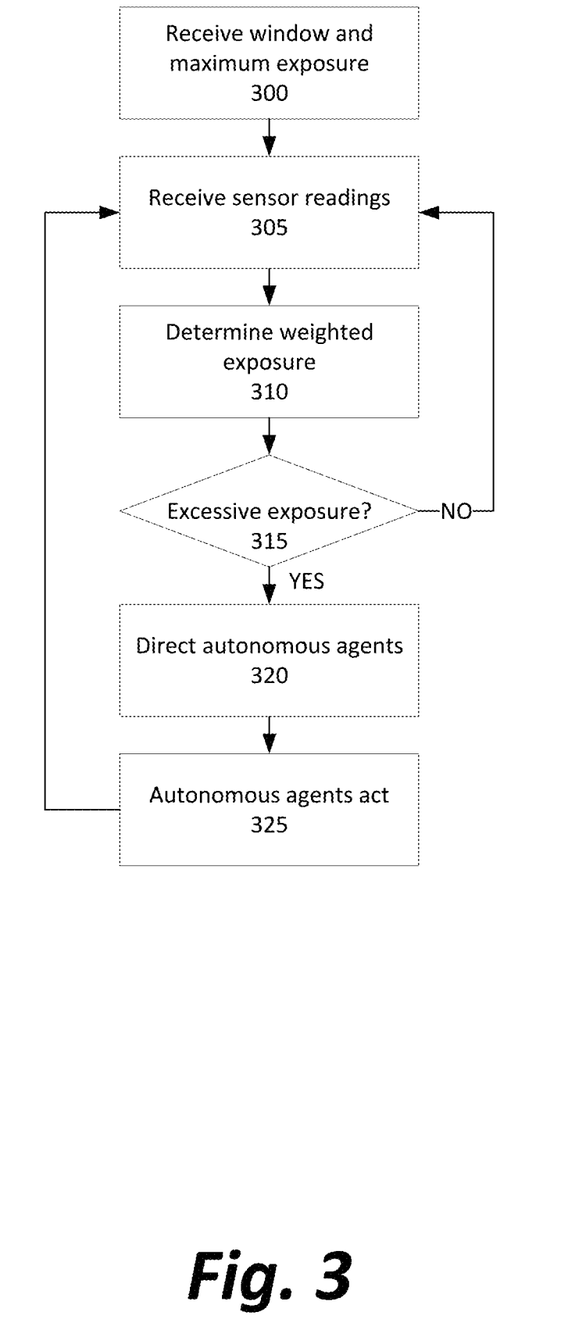
FIG. 3 depicts a method for an artificial intelligence system to process the incoming sensor data and direct the agents in the chaotic environment.

FIG. 3 depicts a method for an artificial intelligence system to process the incoming sensor data and direct the agents in the chaotic environment.

First, the system may receive (from an external server, a saved configuration file, entry by a human user, or some other source) a critical time window to consider and a maximum permissible weighted risk exposure (Step 300). For example, a weather evacuation system may be configured to look out only one week in advance, due to the uncertainty of data beyond that time window. A system monitoring asset prices may be uninterested in any time period after the market closes for a given day.

Next, the system receives sensor data from sensors 105 regarding the environment and resources (Step 305). In some embodiments, the system may be preconfigured with information regarding the expected behavior of elements of the environment or of the resources. In other embodiments, the system may receive sensor data over a period of time and build a model for the behavior for those elements and resources.

For example, for an element of the chaotic environment that experiences random-walk-like behavior (such as the movements of an animal in a preserve, or the changes in value of an asset in a market), in which case the system may determine a standard deviation of volatility for change in the system, to aid in determining the probability that the element will change by a given amount during a given interval of time.

In another example, the chaotic environment may experience cyclical swings, such as increased use of a streaming service or power utility in the evening and decreased use overnight. The system may determine the period of such a cycle and use it in anticipating systemic changes during future cycles.

After at least an initial amount of sensor data is received and processed, the central server determines the total weighted risk exposure of the system (Step 310).

As discussed above, this determination may be made at least in part based on integrating, for all t before the end of the critical time window, P (event occurring at or before t) multiplied by the cost function for an event at time t.

The system may assume that a given environmental variable (such as the position of a danger along a given axis or the value of an asset on a certain scale) experiences random-walk-like behavior, and so the probability of the variable covering a given distance over time is not proportional to the distance, but rather diminishes at a faster rate than a linear proportion. In a preferred embodiment, the "distance" between two environmental values a and b should not be calculated as |a-b|, but rather as $(a-b)^2$. In addition, the sensed values may be modified before calculation in certain embodiments, such as determining a distance between ln a and ln b rather than between a and b.

Various embodiments may also take into account a natural volatility in the underlying system whose environmental variables are being sensed. Dividing the distance by a measure of volatility, such as a value proportional to the standard deviation of the sensed variable values over a period of time, will more accurately represent the fact that random walks in faster-paced and more chaotic systems are more likely to cover a distance in a given time interval than those in slower-paced systems. The standard deviation may be calculated in terms of a number of seconds, minutes, or days previous to the current risk exposure calculation, or a predetermined number of sensor readings regardless of the time interval comprising those readings. The standard deviation may be set to a predetermined default value when either the volume of data or the brevity of an available previous time window makes the standard deviation more influenced by noise in the data and less likely to reflect the actual future changes in the variable over a coming time window.

In a preferred embodiment including a squared distance term and an allowance for volatility as described above, if the random-walk-like behavior has a standard deviation of $\sigma$ with a current mean value of $z_0$, the cumulative probability of the environmental variable reaching a certain value z at exactly time t is equal to $$\frac{(z-z_0)}{\sqrt{2\pi\sigma^2 t^3}} e^{-\frac{(z-z_0)^2}{2\pi\sigma^2 t}}$$

Given this assumption, the integral of this function over a total remaining time interval of length T (i.e., the cumulative probability that the event will occur at some point during the interval) is $$ERFC\left(\frac{|z-z_0|}{\sigma\sqrt{2T}}\right)$$

where ERFC is the complementary error function. If the cost function of an event is constant with respect to time, the total weighted risk exposure will thus be equal to $$\sum_k \left(C_k \times ERFC\left(\frac{|z_k - z_{0_k}|}{\sigma_k\sqrt{2T}}\right)\right)$$

where k represents each resource and $C_k$ the cost to that resource if the event occurs.

Other probability functions may be used to estimate probabilities of change in systems that do not seem to experience random-walk behavior. These probability functions may likewise be integrated with respect to time to determine a shortcut calculation for a cumulative probability of an event and for determining an overall weighted risk exposure.

The cost associated with a given resource may be an estimate, for example, of the cost of repairing a physical item, the abstracted cost of pain, suffering, or loss of life, abstracted costs of loss of goodwill for a consumer-facing system going down when consumers are relying on it, or pure economic losses from participation in an ill-advised trade in a market setting. In many cases, the cost may be an expected cost for a class of event that itself may have a wide range of possible actual costs.

After determining total weighted risk exposure, the system determines whether a total weighted risk exposure exceeds the stored maximum permissible weighted exposure (Step 315).

If there is not excessive risk exposure, the system returns to receiving sensor data during a new period of time (Step 305) and recalculating whether the risk exposure has changed in response to updated data from the sensors 105. In some embodiments, the total number of calculations involved in recalculating total risk exposure may be onerous, and the system may only recalculate the total weighted risk exposure when a given environmental variable has changed by at least a certain minimum threshold amount from the last time that the total weighted risk exposure was calculated. Additionally, in some embodiments, the system may round, truncate, or otherwise preprocess environmental variable data before recalculation in order to simply recalculation or determine that it is not yet necessary.

If, on the other hand, there is excessive risk exposure, the system may transmit a message or instruction to agents 115 (Step 320) in order to begin minimizing risk through the moving resources, notifying human users of the risk to the resources, or otherwise reconfiguring resources to minimize the risk from the environment, as described in embodiments above. After transmission of the message, the system returns to observing sensor data (Step 305 and following) and determining whether an excessive risk exposure still exists and requires further action by the agents.

In a specific embodiment directed to minimizing exposure within a stock market setting, additional considerations and actions may be taken in the determining of the exposure or the response to it.

For example, in addition to the changes in an asset price that an order refers to, the order itself may be modified, such as changing an offered price, an offered volume, a status (offered, accepted, or filled). An "order book" containing all open orders may be maintained and updated as orders are offered, modified, or filled, affecting the total exposure an entity may have across one or more stock exchanges. The software maintaining an order book may need to keep the order book accurate despite complex chains of reported status updates and modifications, such as an order which is offered, modified, accepted, modified again, and filled partially from one source and partially from another. The task may be further complicated by messages being received out of order, such as confirmation of an order modification being received before notification of the request to modify the order, so that incoming messages may be queued until the context needed to make sense of them is also received.

The total order book for a firm may be used to estimate the total financial risk for the firm at a given moment in time—for example, if the firm has outstanding offers to buy an asset at a given price, but the market price has decreased below that given price and allowed other traders to arbitrage and essentially receive free money at the firm's expense. Using the mathematical calculations described above, outstanding offers may be weighted by a probability that they will actually be filled, which will be inversely related to the distance of an offer's current price and the market's current price. As the market price fluctuates or the offer price is modified, the total risk exposure for a firm may be recalculated to determine whether action is necessary to reduce that exposure. Examples of actions may include automatically generating a modification instruction for one or more outstanding orders and transmitting the instruction to one or more exchanges on which those orders have been placed; automatically generating a notice for a human user that an increased level of financial risk has been reached and additional care should be exercised; or even preventing (via control over a communications interface of a computer used for trading) the transmission of additional orders to the exchanges until total risk exposure has decreased or a human user has authorized the resumption of trading.

Figure 4:
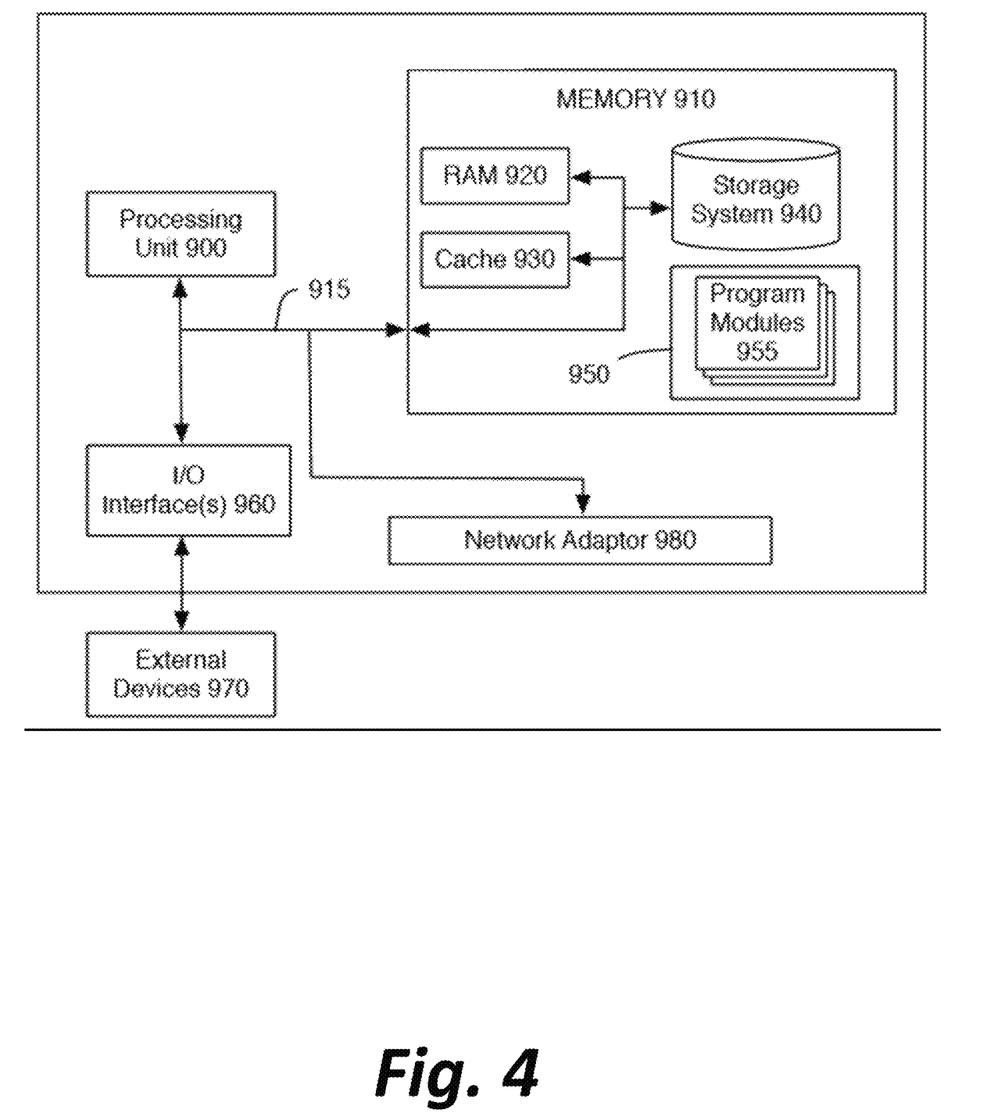
FIG. 4 depicts a general computing device for performing a number of features described above.

FIG. 4 is a high-level block diagram of a representative computing device that may be utilized to implement various features and processes described herein, for example, the functionality of central server 100, sensors 105, or autonomous agents 115. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 4, the computing device is illustrated in the form of a special purpose computer system. The components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. An artificial-intelligence system for manipulating resources to minimize exposure harm in a chaotic environment, comprising:
one or more autonomous agent devices; and
a central server comprising a processor and non-transitory memory storing instructions that, when executed by the processor, cause the processor to:
receive, during an initial time period, a first set of sensor readings from one or more remote electronic sensors, during a first time window, the sensor readings recording values of one or more variables experiencing motion modelable by a random walk in the chaotic environment;
determine a volatility of the one or more variables based on the first set of sensor readings;
receive a critical time interval after the initial time period during which the chaotic environment may affect one or more of the resources and a maximum permitted risk exposure for the time interval;
determine, based on the first set of sensor readings, a weighted total risk exposure during the critical time interval from the chaotic environment and the resources within the chaotic environment, based at least in part on an integration with respect to time of a risk function from a present moment to the conclusion of the critical time interval;
determine that the weighted total risk exposure exceeds the maximum permitted risk exposure; and
in response to determining that that the weighted total risk exposure exceeds the maximum permitted risk exposure, cause the one or more autonomous agent devices to temporarily decrease a current rate of data transmission through a communications interface of a computing device in order to decrease the weighted total risk exposure.

2. The system of claim 1, wherein the non-transitory memory stores instructions that, when executed by the processor, further cause the processor to:
receive a second set of sensor readings from the one or more remote electronic sensors during the second time window recording change in the one or more variables; and
update the weighted total risk exposure during the critical time interval based at least in part on the second set of sensor readings.

3. The system of claim 2, wherein the non-transitory memory stores instructions that, when executed by the processor, further cause the processor to:
subsequent to manipulating the one or more resources to decrease the weighted total risk exposure and to updating the weighted total risk exposure, repeatedly manipulating the one or more resources and updating the weighted total risk exposure until the weighted total risk exposure does not exceed the maximum permitted risk exposure.

4. The system of claim 1, wherein the risk function is based at least in part on the complementary error function.

5. The system of claim 1, wherein the one or more autonomous agent devices further respond to determining that that the weighted total risk exposure exceeds the maximum permitted risk exposure by transmitting a network message to a remote computing device.

6. The system of claim 1, wherein the one or more autonomous agent devices further respond to determining that that the weighted total risk exposure exceeds the maximum permitted risk exposure by generating a message for receipt by a human user.

7. The system of claim 1, wherein the one or more autonomous agent devices further respond to determining that that the weighted total risk exposure exceeds the maximum permitted risk exposure by activating an alarm visible or audible to a human user.

8. The system of claim 1, wherein the first set of sensor readings comprise sensor readings that refer to other sensor readings not yet received, and wherein the system further comprises a queue for storing sensor readings for delayed processing after the other sensor readings referred to have been received.

9. An artificial-intelligence method for manipulating resources to minimize exposure harm in a chaotic environment, comprising:
    receiving, during an initial time period, a first set of sensor readings from one or more remote electronic sensors, during a first time window, the sensor readings recording values of one or more variables experiencing motion modelable by a random walk in the chaotic environment;
    determine a volatility of the one or more variables based on the first set of sensor readings;
    receiving a critical time interval after the initial time period during which the chaotic environment may affect one or more of the resources and a maximum permitted risk exposure for the time interval;
    determining, based on the first set of sensor readings, a weighted total risk exposure during the critical time interval from the chaotic environment and the resources within the chaotic environment, based at least in part on an integration with respect to time of a risk function from a present moment to the conclusion of the critical time interval;
    determining that the weighted total risk exposure exceeds the maximum permitted risk exposure; and
    in response to determining that that the weighted total risk exposure exceeds the maximum permitted risk exposure, causing one or more autonomous agent devices to temporarily decrease a current rate of data transmission through a communications interface of a computing device in order to decrease the weighted total risk exposure.

10. The method of claim 9, wherein the non-transitory memory stores instructions that, when executed by the processor, further cause the processor to:
    receive a second set of sensor readings from the one or more remote electronic sensors during the second time window recording change in the one or more variables; and
    update the weighted total risk exposure during the critical time interval based at least in part on the second set of sensor readings.

11. The method of claim 10, wherein the non-transitory memory stores instructions that, when executed by the processor, further cause the processor to:
    subsequent to manipulating the one or more resources to decrease the weighted total risk exposure and to updating the weighted total risk exposure, repeatedly manipulating the one or more resources and updating the weighted total risk exposure until the weighted total risk exposure does not exceed the maximum permitted risk exposure.

12. The method of claim 9, wherein the risk function is based at least in part on the complementary error function.

13. The method of claim 9, wherein the one or more autonomous agent devices further respond to determining that that the weighted total risk exposure exceeds the maximum permitted risk exposure by transmitting a network message to a remote computing device.

14. The method of claim 9, wherein the one or more autonomous agent devices further respond to determining that that the weighted total risk exposure exceeds the maximum permitted risk exposure by generating a message for receipt by a human user.

15. The method of claim 9, wherein the one or more autonomous agent devices further respond to determining that that the weighted total risk exposure exceeds the maximum permitted risk exposure by activating an alarm visible or audible to a human user.

16. The method of claim 9, wherein the first set of sensor readings comprise sensor readings that refer to other sensor readings not yet received, and further comprising:
    storing a sensor reading referring to an unreserved sensor reading In a queue;
    receiving the sensor reading referred to; and
    processing the sensor reading stored in the queue subsequent to the sensor reading referred to.

* * * * *